(12) United States Patent
Fernandez

(10) Patent No.: US 7,350,478 B2
(45) Date of Patent: Apr. 1, 2008

(54) VALVED TEATCUP ASSEMBLY

(75) Inventor: Marcel Fernandez, Sonzay (FR)

(73) Assignee: Bou-Matic Technologies Corporation, Madison, WI (US)

( * ) Notice: Subject to any disclaimer, the term of this patent is extended or adjusted under 35 U.S.C. 154(b) by 0 days.

(21) Appl. No.: 11/352,848

(22) Filed: Feb. 13, 2006

(65) Prior Publication Data

US 2007/0157887 A1    Jul. 12, 2007

(30) Foreign Application Priority Data

Jan. 6, 2006    (EP)    .................................. 06000233

(51) Int. Cl.
    *A01J 5/04*    (2006.01)
(52) U.S. Cl. .................................. 119/14.47
(58) Field of Classification Search ............. 119/14.47, 119/14.48, 14.49, 14.1, 14.5, 14.51, 14.52, 119/14.53
    See application file for complete search history.

(56) References Cited

U.S. PATENT DOCUMENTS

| 1,159,103 | A | 11/1915 | Sabroe |
|---|---|---|---|
| 4,269,143 | A | 5/1981 | Erbach |
| 4,452,177 | A | 6/1984 | Plett |
| 4,481,906 | A | 11/1984 | Steingraber et al. |
| 4,483,272 | A | 11/1984 | Tonelli |
| 4,530,307 | A | 7/1985 | Thompson |
| 4,582,022 | A | 4/1986 | Noorlander et al. |
| 4,648,350 | A | 3/1987 | Noorlander |
| 5,178,095 | A | 1/1993 | Mein |
| 5,218,924 | A | 6/1993 | Thompson et al. |
| 6,009,834 | A | 1/2000 | Krone et al. |
| 6,039,001 | A | 3/2000 | Sanford |
| 6,055,931 | A | 5/2000 | Sanford, Jr. |
| 6,058,879 | A | 5/2000 | Miefalk |
| 6,439,156 | B1 | 8/2002 | Fleischman |
| 6,796,272 | B1 | 9/2004 | Chowdhury |

FOREIGN PATENT DOCUMENTS

| DE | 269 453 | 1/1914 |
|---|---|---|
| DE | 199 12 615 | 9/2000 |
| EP | 0 566 977 | 4/1993 |
| WO | WO-03/024203 | 3/2003 |

*Primary Examiner*—T. Nguyen
(74) *Attorney, Agent, or Firm*—Andrus, Sceales, Starke & Sawall, LLP

(57) ABSTRACT

A teatcup assembly includes a shell having a liner, and a pressure responsive valve movably mounted in the shell for movement between open and closed positions at the beginning and end of a milking interval.

4 Claims, 3 Drawing Sheets

VALVED TEATCUP ASSEMBLY

CROSS REFERENCE TO RELATED APPLICATION

This application claims the benefit of and priority from European Patent Application No. 06000233.4, filed Jan. 6, 2006.

BACKGROUND AND SUMMARY

The invention relates to a teatcup assembly for milking a mammal, and more particularly to a valved teatcup assembly.

Teatcup assemblies having a liner for receiving a teat are known in the prior art. A plurality of teatcups are connected to respective teats depending from the udder of a mammal. Each teatcup assembly has a shell with an inner liner or inflation around a respective teat and defining a milk flow passage within the liner below the teat, and a pulsation chamber outside the liner between the liner and the teatcup shell, all as is known in the prior art, for example U.S. Pat. Nos. 4,269,143, 4,530,307, 5,178,095, 5,218,924, 6,039,001, 6,796,272, all incorporated herein by reference. The system has a pulsation milking cycle with an on portion and an off portion. Milk flows from the teat towards a milking claw during the on portion, and then to a storage vessel. During the off portion, the liner is collapsed around the teat, to massage the teat to aid in the circulation of body fluids. Vacuum is continuously applied to the milk flow passage within the liner. Vacuum is alternately and cyclically applied to the pulsation chamber between the liner and the teatcup shell, to open and close the liner, all as is known.

The present invention arose during continuing development efforts directed toward teatcup assemblies.

DETAILED DESCRIPTION

Figure 1:
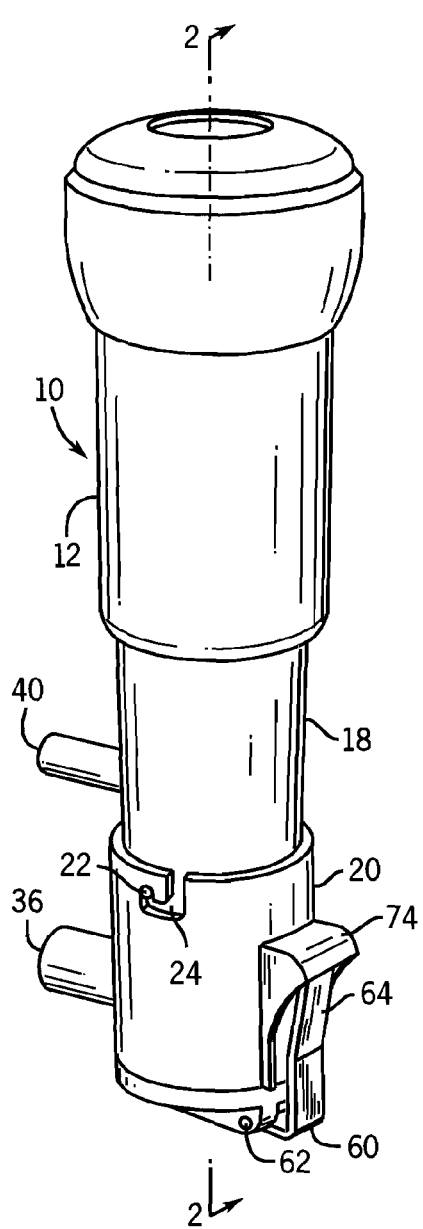
FIG. 1 is a perspective view of a teatcup assembly in accordance with the invention.
Figure 2:
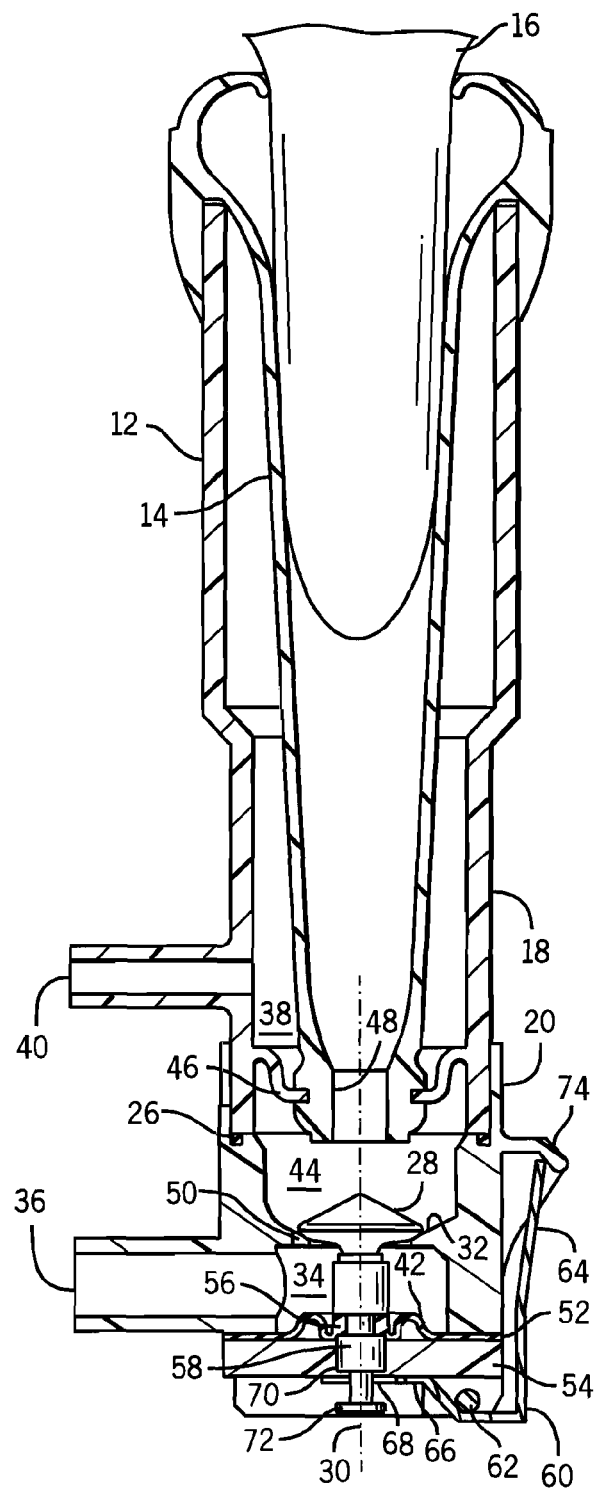
FIG. 2 is a sectional view taken along line 2-2 of FIG. 1.
Figures 3, 4:
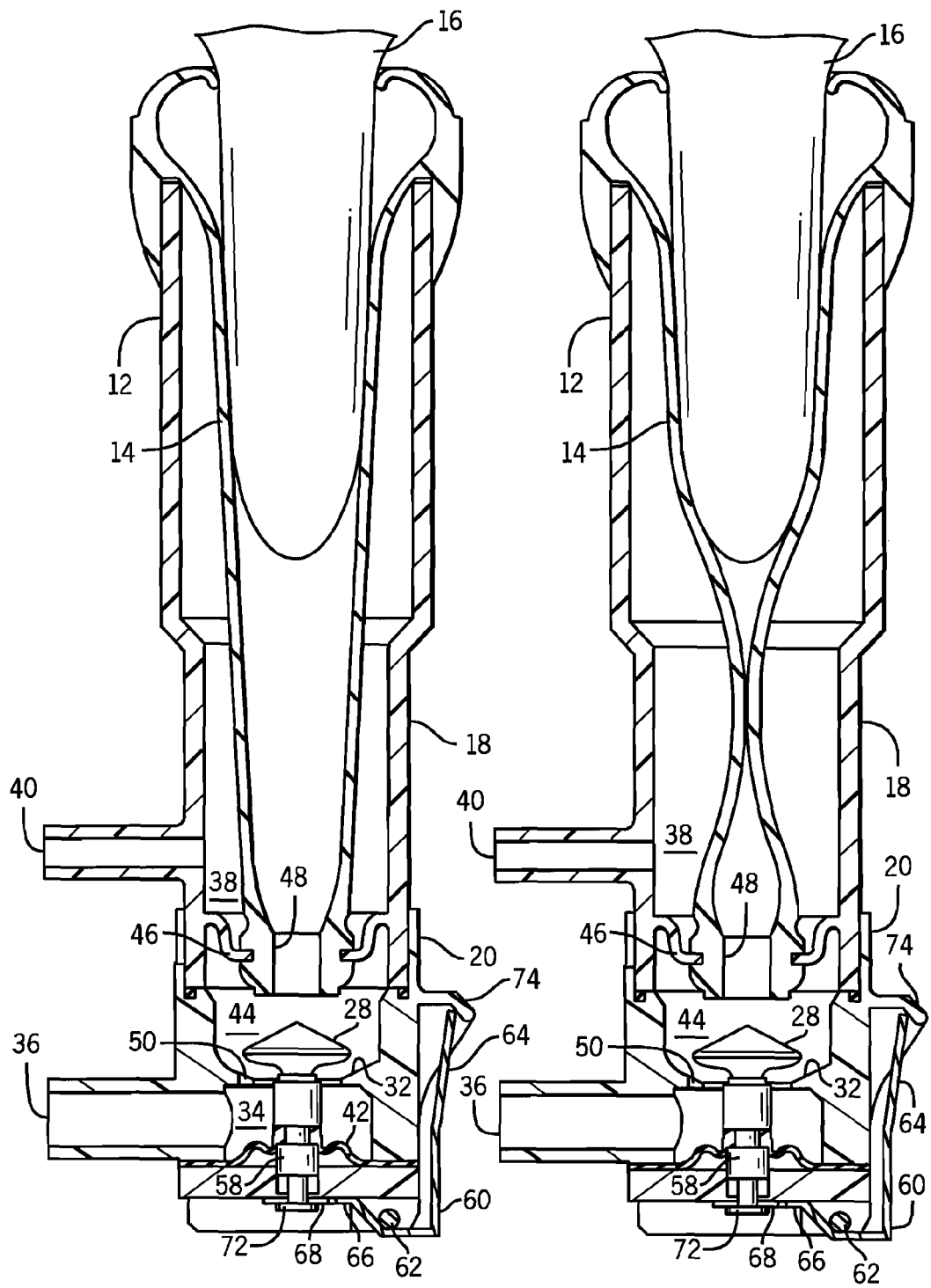
FIG. 3 is like FIG. 2 and shows a further operational condition.
FIG. 4 is like FIG. 2 and shows a further operational condition.

FIGS. 1-5 show a teatcup assembly 10 including a shell 12 having a liner 14 for receiving a teat 16 of a mammal to be milked. The shell includes an upper part 18 inserted axially downwardly into a lower part 20 and then turned to lock tab 22 in place in slot 24, and preferably in sealed relation by an O-ring 26 therebetween. A valve 28 is movably mounted in the shell for axial up-down movement along axis 30 between a closed position, FIG. 2, engaging a valve seat 32, and an open position, FIG. 3, disengaging the valve seat. A vacuum chamber 34 is provided in the shell below valve seat 32 and has a vacuum port 36 for applying vacuum thereto. A pulsation chamber 38 is provided in the shell between shell 12 and liner 14 and has a pulsation port 40 for applying pulsation vacuum in a pulsation milking cycle having an off portion blocking milk flow, and having an on portion permitting milk flow. As is known, vacuum is continuously applied to port 36, and vacuum is alternately and cyclically applied to port 40 to alternately collapse and open liner 14 around teat 16, FIGS. 4 and 3, providing the noted off and on portions, respectively, of the pulsation milking cycle, and providing massage of the teat during the off portion to aid in circulation of body fluids, reduce mastitis, etc., all as is known.

Valve 28 is actuated by pressure differential thereacross, to be described. The teatcup is attached to the teat for a milking interval having a plurality of pulsation milking cycles each having the noted on and off portion. Valve 28 is moved in a first direction, e.g. axially upwardly in FIGS. 2, 3, away from valve seat 32 from the closed position of FIG. 2 to the open position of FIG. 3 at the beginning of the milking interval. Valve 28 is moved in a second opposite direction, e.g. axially downwardly, towards the valve seat from the open position to the closed position at the end of the milking interval. The noted pressure differential actuates the valve in one of the noted directions, namely downwardly in the disclosed embodiment. A biasing member provided by membrane diaphragm 42 biases valve 28 in one of the noted directions toward one of the noted open and closed positions, e.g. axially upwardly toward the open position, FIG. 3. Valve 28 is actuated by the noted pressure differential in the other of the noted directions to the other of the open and closed positions, e.g. axially downwardly against the bias of biasing member 42.

An intermediate chamber 44 is provided in the shell above vacuum chamber 34 and below pulsation chamber 38. Intermediate chamber 44 is in selective communication with vacuum chamber 34, namely through valve seat 32 when valve 28 is in the open position, FIG. 3. Intermediate chamber 44 is isolated from pulsation chamber 38 by an annular flange 46. Shell 12 and liner 14 extend axially along axis 30 and have an annular space therebetween defining pulsation chamber 38. Liner 14 has a lower end 48 held in place in the shell by flange 46 extending radially across the noted annular space and isolating pulsation chamber 38 from intermediate chamber 44 therebelow. A calibrated air leak vent 50 is provided through valve seat 32 between vacuum chamber 34 and intermediate chamber 44 and provides communication of vacuum into the latter upon attachment of the teatcup assembly to the teat at the beginning of the milking interval to neutralize pressure difference across valve 28 between intermediate chamber 44 and vacuum chamber 34 such that biasing member 42 moves valve 28 upwardly from the closed position of FIG. 2 to the open position of FIG. 3. In the disclosed embodiment, the biasing member 42 is a membrane diaphragm having an outer periphery 52 sealed to the teatcup shell between lower part 20 and a lower wall 54, and having an inner periphery 56 sealed to the valve at valve stem 58 and biasing the valve to a normally upward biased position. After attachment of the teatcup assembly and upward movement of valve 28 to its open position, the pulsation vacuum at port 40 alternately collapsingly closes and opens liner 14, FIGS. 4 and 3, respectively, during a plurality of pulsation milking cycles, as above noted.

Figure 5:
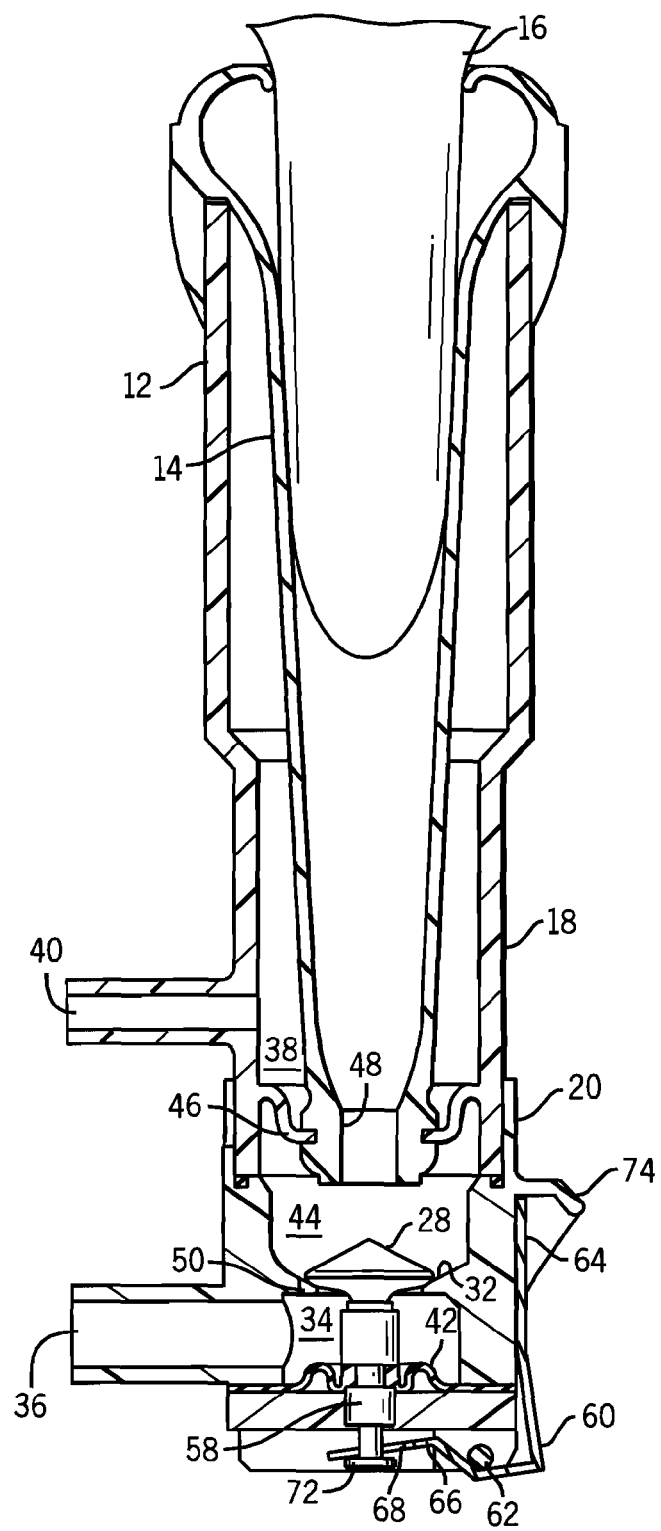
FIG. 5 is like FIG. 2 and shows a further operational condition.

A lever 60 is pivotally mounted to the shell at a pivot 62, and has a first arm 64 extending from the pivot for engagement by a dairyman for manually pivoting the lever, and has a second arm 66 extending from the pivot and engaging the valve at valve stem 58 to move the valve to the closed position, FIG. 5, upon pivoting of the lever in a first pivot direction to a first pivoted position, e.g. manually pivoting the lever counterclockwise to the position shown in FIG. 5 by pushing lever arm 64 leftwardly toward the shell. Lever 60 is pivotable in a second pivot direction to a second pivoted position, e.g. clockwise to the position in FIG. 2, with lever arm 64 in its rightward position. The noted second pivot direction is opposite to the noted first pivot direction. Arm 66 engages the valve at valve stem 58 in lost motion connection, e.g. by a slot or aperture such as 68 through which the valve stem extends, such that in the noted second pivoted position of the lever, FIG. 2, valve 28 may move between its closed and open positions, FIGS. 2 and 3, respectively. The shell has the noted lower wall 54 with an axially upwardly extending guide bore 70 therethrough. The valve has the noted axially downwardly extending stem 58 extending through and slidingly engaging bore 70 in guided relation therewith and having a lower enlarged flange 72. Arm 66 of lever 60 engages valve stem 58 below lower wall 54 and above flange 72 in the noted lost motion connection. Upon the noted counterclockwise pivoting of lever 60 to the position shown in FIG. 5, arm 66 at slot 68 slides downwardly along valve stem 58 and then engages flange 72 to move the valve downwardly to the closed position. The shell includes a shroud 74 above lever arm 64 and permitting left-right movement of the latter but restricting access thereto to minimize accidental or unintended actuation of lever arm 64.

In a manual detach mode, the dairyman operator pushes lever arm 64 inwardly toward the shell, i.e. leftwardly in the drawings, to move valve 28 downwardly to its closed position, FIG. 5, whereafter the valve stays closed after detachment, due to atmospheric pressure above the valve and the continuous vacuum below the valve at port 36. In the event of a kick-off of the teatcup assembly by the mammal, the atmospheric pressure above the valve creates a pressure differential across the valve due to the continuous vacuum therebelow at port 36, whereby the valve automatically moves to its closed position, FIG. 2, such that milk residues are kept in the milk line exiting from port 36. After detachment and during the washing mode, the valve is automatically opened and closed by the pressure variations generated during the washing cycle for cleaning.

It is expected that various equivalents, alternatives and modifications are possible within the scope of the appended claims.

What is claimed is:

1. A teatcup assembly comprising a shell having a liner for receiving a teat, a valve movably mounted in said shell for movement between a closed position engaging a valve seat, and an open position disengaging said valve seat, a vacuum chamber in said shell below said valve seat and having a vacuum port for applying vacuum thereto, a pulsation chamber in said shell between said shell and said liner and having a pulsation port for applying pulsation vacuum in a pulsation milking cycle having an off portion blocking milk flow, and having an on portion permitting milk flow, wherein said valve is actuated by pressure differential thereacross, wherein said teatcup assembly is attached to said teat for a milking interval having a plurality of pulsation milking cycles each having said on portion and said off portion, wherein said valve is moved in a first direction away from said valve seat from said closed position to said open position at the beginning of said milking interval, and said valve is moved in a second opposite direction towards said valve seat from said open position to said closed position at the end of said milking interval, said pressure differential actuating said valve in one of said directions, and comprising a biasing member biasing said valve in one of said directions toward one of said open and closed positions, and wherein said valve is actuated by said pressure differential in the other of said directions to the other of said open and closed positions against the bias of said biasing member, and comprising a lever pivotally mounted to said shell at a pivot, and having a first arm extending from said pivot for engagement by a dairymen for manually pivoting said lever, and having a second arm extending from said pivot and engaging said valve to move said valve to said closed position upon pivoting of said lever in a first pivot direction to a first pivoted position.

2. The teatcup assembly according to claim 1 wherein said lever is pivotable in a second pivot direction to a second pivoted position, said second pivot direction being opposite to said first pivot direction, said second arm engaging said valve in lost motion connection such that in said second pivoted position of said lever, said valve may move between said closed and open positions.

3. The teatcup assembly according to claim 2 wherein said shell has a lower wall with an axially upwardly extending guide bore therethrough, said valve has an axially downwardly extending stem extending through and slidingly engaging said bore in guided relation therewith, and said second arm engages said stem below said lower wall in said lost motion connection.

4. The teatcup assembly according to claim 1 wherein said shell has a shroud permitting movement of said first arm and said pivoting of said lever but restricting access to said first arm to minimize accidental and unintended actuation thereof.

* * * * *